No. 758,878. PATENTED MAY 3, 1904.
W. H. WANSBROUGH.
MEANS FOR CONNECTING RUNNING GEARS TO VEHICLE BODIES.
APPLICATION FILED MAR. 21, 1903.
NO MODEL.

Witnesses:
George Oltsch.
Maggie Oltsch.

William H. Wansbrough.
Inventor
By Theodore Dalton
Atty.

No. 758,878.

Patented May 3, 1904.

UNITED STATES PATENT OFFICE.

WILLIAM H. WANSBROUGH, OF SOUTH BEND, INDIANA.

MEANS FOR CONNECTING RUNNING-GEARS TO VEHICLE-BODIES.

SPECIFICATION forming part of Letters Patent No. 758,878, dated May 3, 1904.

Application filed March 21, 1903. Serial No. 148,991. (No model.)

*To all whom it may concern:*

Be it known that I, WILLIAM H. WANSBROUGH, a citizen of the United States, residing at South Bend, in the county of St. Joseph and State of Indiana, have invented certain new and useful Improvements in Means for Connecting Running-Gears with Vehicle-Bodies; and I do hereby declare the following to be a full, clear, and exact description of the invention, such as will enable others skilled in the art to which it appertains to make and use the same.

This invention relates to means for connecting running-gears with vehicle-bodies, the object being to provide an improved form of connection between the running-gear or springs and the body of the vehicle; and to this end the invention embodies a novel arrangement and aggroupment of parts by which various styles of bodies may be rapidly and conveniently attached to or detached from the same gear, and vice versa.

For a full understanding of the merits of the invention reference is to be had to the following description and the accompanying drawings, in which like characters of reference indicate corresponding parts throughout the several views, and wherein—

Figure 1:
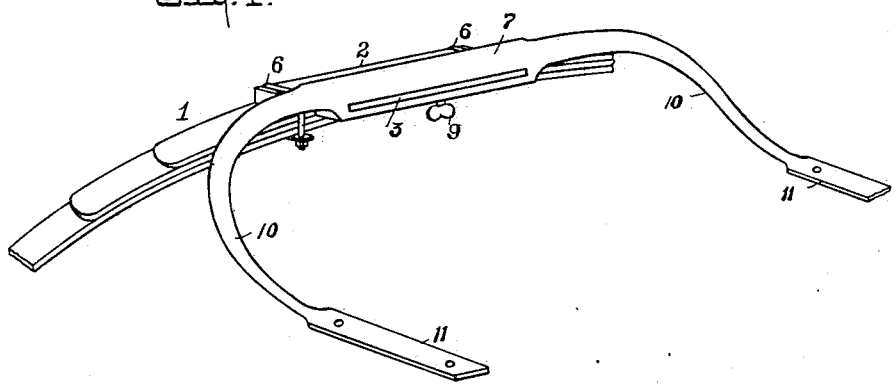
Figure 2:
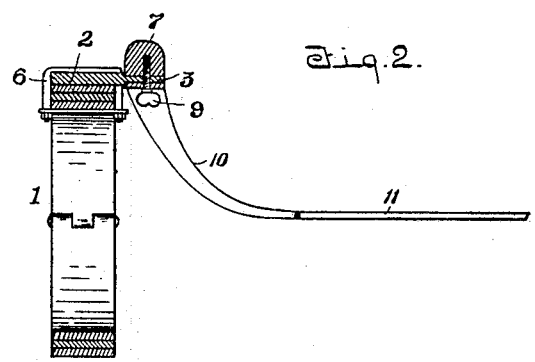
Figure 3:
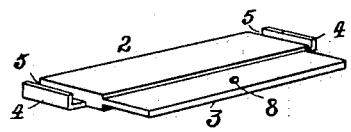

Figure 1 is a perspective of the parts connected embodying all the features of my invention. Fig. 2 is a transverse section through the parts when connected. Fig. 3 is a perspective of the bracket-plate which is carried by the springs.

Making renewed reference to the drawings, 1 designates an ordinary elliptical spring of a vehicle to which is attached a bracket-plate 2, having a laterally-extended reduced bearing portion 3, which is shorter than the body or thicker portion 2, thereby providing projecting ends 4 on the thicker portion. These projecting ends of the bracket are formed with transverse recesses or depressions 5, into which the U-shaped clips 6 fit to secure it to the spring and by means of which longitudinal and transverse displacement of the bracket is prevented notwithstanding any loosening which might have occurred from continued jarring.

The body-hanger 7 comprises an approximately U-shaped member the central portion of which is thickened and provided with a horizontally-disposed slot extending entirely through it transversely and adapted to receive the extended bearing portion 3 of the bracket.

From the description thus far considered it will be obvious that a detachable connection is established between the running-gear or springs and the vehicle-body and that substantial bearing-surfaces are provided for the connecting elements.

In the extended bearing portion 3 is formed a threaded aperture 8, adapted to aline with similar apertures in the hanger 7 when the parts are engaged, and into these apertures is let a thumb-screw 9, which locks the hanger to the bracket.

The hanger is formed with drop portions 10, as usual, which terminate in horizontal ends 11, adapted for permanent connection with the vehicle-body.

By means of the detachable connection between the bracket and the hanger various styles of bodies may be fitted with the hanger and connected at will to the running-gear, and similar bodies may also be attached to different makes of running-gears.

Having thus described my invention, what I claim is—

1. The combination of a vehicle-spring, a bracket secured thereto provided with a reduced lateral extension, a body-hanger having a slot to receive the lateral extension, and a thumb-screw engaging the hanger and the extension to lock the parts together.

2. The combination with a vehicle-spring, of a bracket-plate having extended recessed ends and a lateral bearing portion, clips to engage the recesses to secure the bracket to the spring, and a body-hanger detachably engaged with the lateral bearing portion.

3. The combination with a vehicle running-gear and a body, of means for connecting the gear to the body, comprising a bracket attached to the spring and having recessed ends, clips engaged in the recesses and embracing the spring, a reduced lateral extension terminated short of the recessed ends, and a body-hanger detachably engaged with the extension.

In testimony whereof I affix my signature in presence of two witnesses.

WILLIAM H. WANSBROUGH.

Witnesses:
GEORGE OLTSCH,
M. S. HENRY.